(12) United States Patent
Chiang (10) Patent No.: US 7,404,246 B2
(45) Date of Patent: Jul. 29, 2008

(54) MANUFACTURING METHOD FOR THE HOLE-PUNCHING ASSEMBLY OF A HOLE-PUNCHING UNIT

(76) Inventor: Chou-Chih Chiang, No. 13, 23rd Rd., Taichung Industrial Park, Taichung (TW)

( * ) Notice: Subject to any disclaimer, the term of this patent is extended or adjusted under 35 U.S.C. 154(b) by 304 days.

(21) Appl. No.: 11/164,942

(22) Filed: Dec. 12, 2005

(65) Prior Publication Data

US 2007/0130747 A1 Jun. 14, 2007

(51) Int. Cl.
*B23P 11/00* (2006.01)
*B42B 5/00* (2006.01)
*G06K 1/10* (2006.01)
*B26D 5/08* (2006.01)
*B26F 1/14* (2006.01)

(52) U.S. Cl. .............. 29/525.01; 29/525.02; 29/525.11; 412/33; 412/38; 234/94; 234/104; 83/618; 83/691

(58) Field of Classification Search .................. 83/549, 83/571, 618–20, 684, 687–89, 691, 678, 83/695, 698.91; 29/525.01, 525.11, 525.02; 412/33, 38, 40; 234/1, 94, 104, 111–113, 234/116, 122
See application file for complete search history.

(56) References Cited

U.S. PATENT DOCUMENTS 6,119,555 A * 9/2000 DiMaria .................... 76/107.1
6,223,636 B1 * 5/2001 LaPlante et al. ................ 83/13

* cited by examiner

*Primary Examiner*—David P. Bryant
*Assistant Examiner*—Alexander P Taousakis
(74) *Attorney, Agent, or Firm*—Pai Patent and Trademark Law Firm; Chao-Chang David Pai (57) ABSTRACT

An improved manufacturing method for the hole-punching assembly of a hole-punching unit is disclosed. The method of the present invention comprises the following steps: (1) forming a plurality of aluminum balancing pieces with a rectangular shape by extrusion, and forming an indentation area on one side of each balancing piece; (2) forming an elongated slot by an application of stamping on the indentation area of each balancing piece; (3) obtaining a plurality of rectangular pieces (the number of which equals that of the balancing pieces), made of iron, and forming a row of holes by a single application of stamping on each rectangular piece; and (4) fitting each of the rectangular pieces onto the indentation area of a balancing piece, and connecting the balancing pieces together by screws or bolts. The manufacturing method can lower the production cost and simplify the production process of the hole-punching assembly.

2 Claims, 8 Drawing Sheets

MANUFACTURING METHOD FOR THE HOLE-PUNCHING ASSEMBLY OF A HOLE-PUNCHING UNIT

BACKGROUND OF THE INVENTION

1. Field of the Invention

The invention generally relates to an improved manufacturing method for the hole-punching assembly of a hole-punching unit. More particularly, the invention relates to an improved manufacturing method that can simplify the production process and lower the production cost and is different from the prior art manufacturing method, which is characterized with a more difficult production process and results in a higher production cost. Therefore, the method of the present invention has a higher level of economic value and usefulness.

2. Description of the Related Art

Multiple-hole punching devices have been used to punch holes on a stack of paper so that the paper may be bound into a book through the holes. Because such a device has a plurality of punching pieces, it needs additional components that can hold a stack of paper and set it into a neat condition so that the punching operation may be carried out smoothly.

Figure 1:
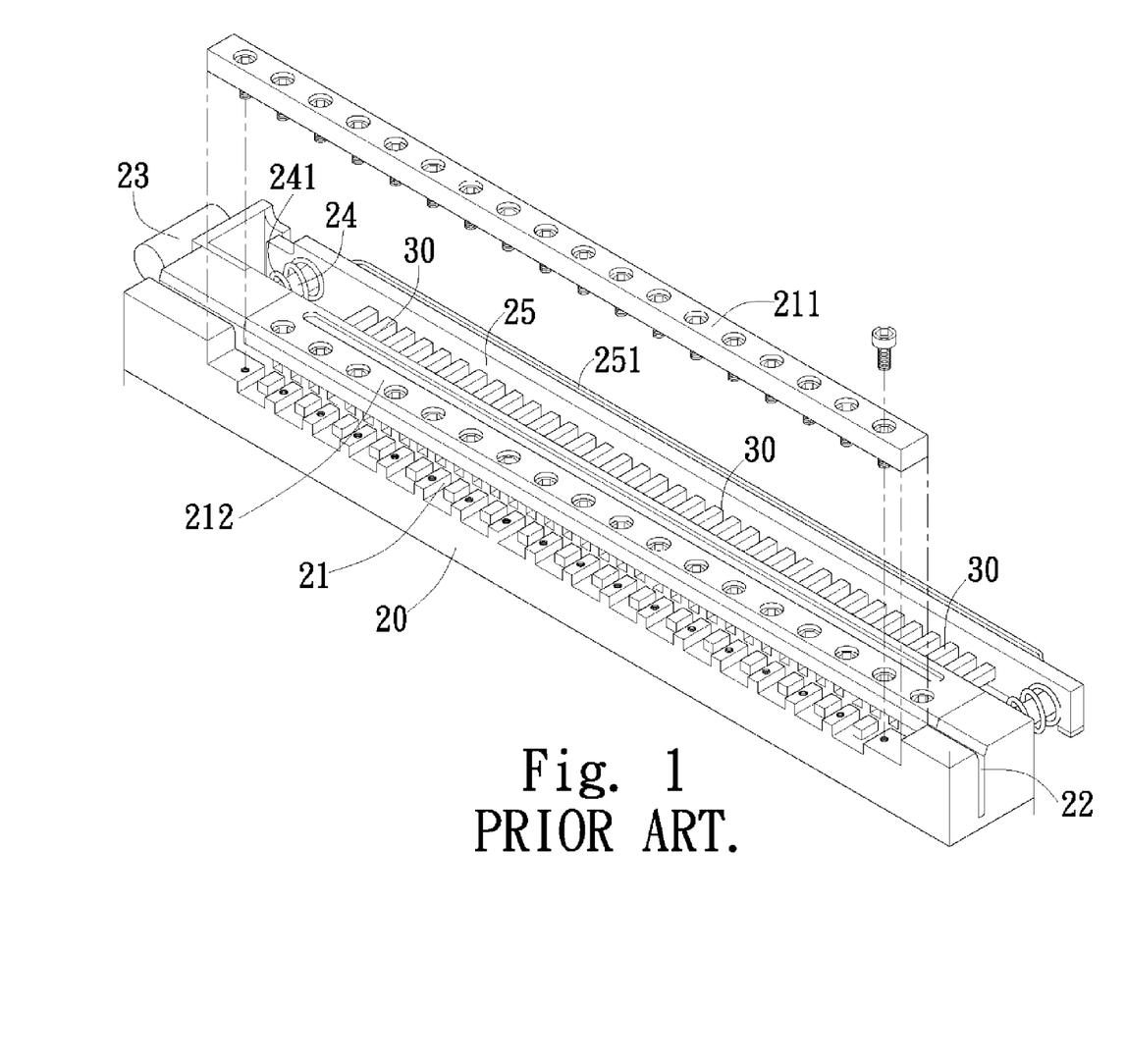
FIG. 1 is a perspective view showing the overall structure of the hole-punching unit of the prior art.
Figure 2:
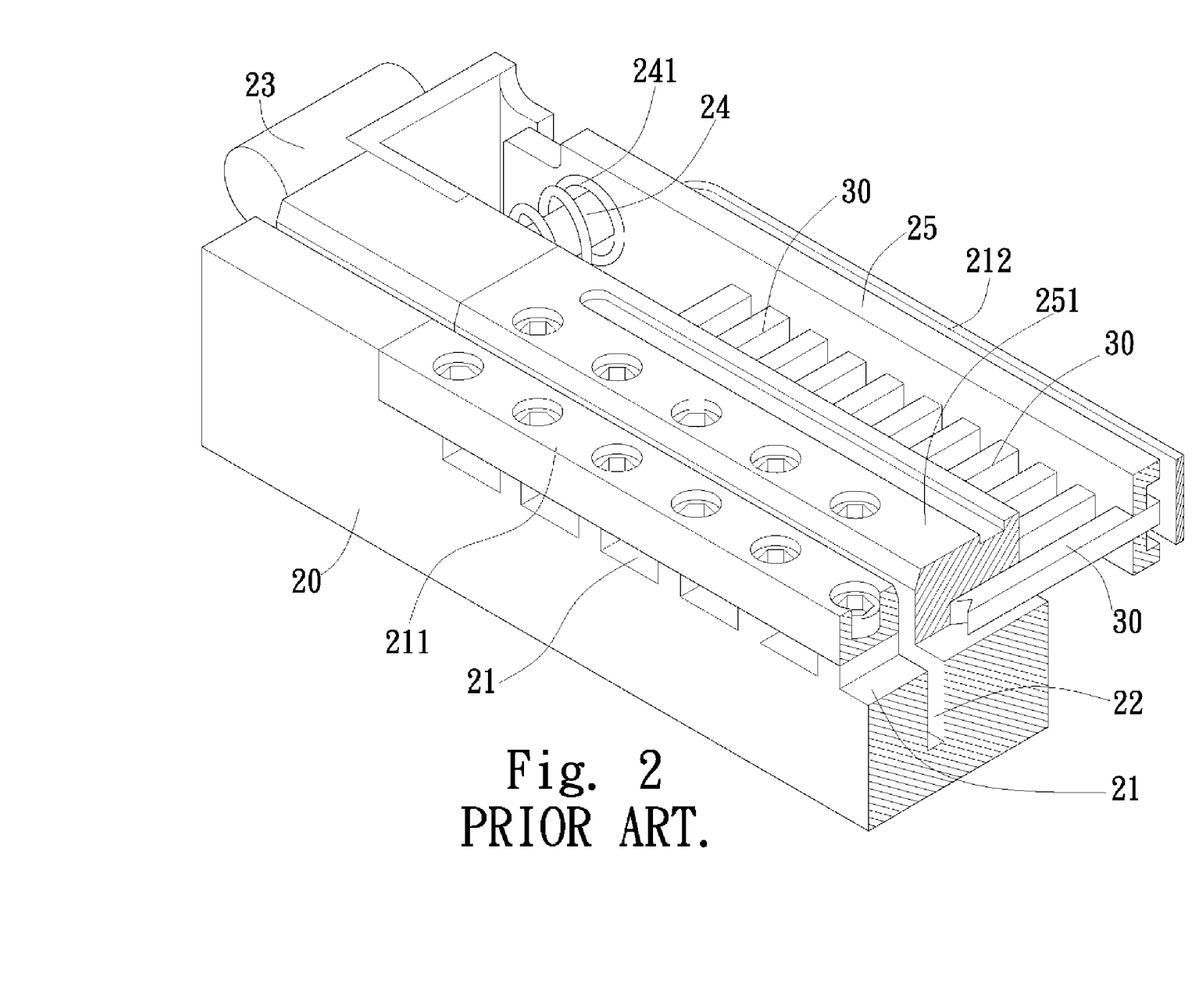
FIG. 2 is a partial sectional view showing the hole-punching unit of the prior art.

Please refer to FIGS. 1 and 2. FIG. 1 is a perspective view showing the overall structure of the hole-punching unit of the prior art. FIG. 2 is a partial sectional view showing the hole-punching unit of the prior art.

The hole-punching unit 20 of the prior art has a row of slots 21, two retaining plates 211 and 212, a grip portion 23, two rods 24, a positioning piece 25, two elastic elements 241 and a plurality of punching pieces 30, A gap 22 for the insertion of a stack of paper is transversely disposed. The slots 21 are separated by a row of ribs. The two retaining plates 211 and 212 are fitted on by bolts. The grip portion 23 is provided on one side of the hole-punching unit 20 so that a user may use the grip portion 23 to fit the unit 20 into a hole-punching machine or take it out from such machine. The two rods 24 are disposed in the two sides of a rear portion of the unit 20. The positioning piece 25 is fitted on the unit 20 with the two rods 24. Each rod goes through an elastic element 241; the proximal ends of the elastic elements 241 press against the unit 20, and the distal ends of the elastic elements 241 press against the positioning piece 25.

The punching pieces 30 may go through and be held in the row of slots 21. A retaining plate 251 is also provided so as to hold the punching pieces 30 in place. If a different number of holes is wanted, a user may unfasten the retaining plate 251 and then take out or add one or more of the punching pieces 30. If the slots 21 have a rectangular shape, the punching pieces 30 should have a rectangular shape. The punching pieces 30 may have different shapes—rectangular, triangular, circular, etc.

The hole-punching unit 20 of the prior art has the following eight disadvantages:

1. The hole-punching unit 20 of the prior art is made of iron and is relatively bulky, hence, more material is needed in its production.

2. The hole-punching unit 20 of the prior art is made of iron, therefore, it is quite heavy. This causes inconvenience in the production process and transport.

3. Because the unit 20 is larger in size and heavier in weight after it is integrally formed, the processing of its gap 22 and slots 21 requires a bigger machine and is relatively more difficult to carry out and more time-consuming. Therefore, the processing cost is higher.

4. Such manufacturing method can only allow the shapes of the slots to be rectangular, triangular or diamond shape (not circular).

5. To cover and protect the slots 21, the two retaining plates 211 and 212 are provided. Hence, the production cost of such unit 20 is high and such a unit 20 has a lower economic value.

6. In the prior art, to make the production process easier to carry out, the unit 20 comprises two halves, which are joined together by screws or bolts. Even so, the disadvantages (such as heavy weight and the processing of the slots 21 being difficult to carry out) still remain.

7. Though there are different types (as according to the shapes of the punching pieces) of the unit 20, their production cost and hence their selling prices are relatively high due to said disadvantages.

8. Because the unit 20 of the prior art is integrally formed and its slots 21 and paper gap 22 require processing, a higher degree of precision in the production and processing is needed; if any of its part is slightly imperfect or imprecise, the operation of the whole unit 20 would be greatly affected and sometimes the whole unit 20 has to be discarded. This constitutes a waste.

Therefore, the disadvantages (such as the high production cost and the difficult production process) of the hole-punching unit 20 of the prior art need to be overcome and its manufacturing method improved. The method of the present invention may be used to overcome these disadvantages as well as to bring up the efficiency in production and enhance the economic value.

To eliminate the disadvantages of the prior art, the inventor has put in a lot of effort in the subject and has successfully come up with the improved manufacturing method for the hole-punching assembly of a hole-punching unit of the present invention. The manufacturing method of the present invention can lower the production cost and simplify the production process of the hole-punching assembly as well as enhance the efficiency in production.

SUMMARY OF THE INVENTION

The object of the present invention is to provide an improved manufacturing method for the hole-punching assembly of a hole-punching unit. The method of the present invention comprises the following steps: (1) forming a plurality of aluminum balancing pieces with a rectangular shape by extrusion, and forming an indentation area on one side of each balancing piece; (2) forming an elongated slot by an application of stamping on the indentation area of each balancing piece; (3) obtaining a plurality of rectangular pieces (the number of which equals that of the balancing pieces), made of iron, and forming a row of holes by a single application of stamping on each rectangular piece; and (4) fitting each of the rectangular pieces onto the indentation area of a balancing piece, and connecting the balancing pieces together by screws or bolts such that two of the balancing pieces are arranged with their rectangular pieces facing each other so as to provide a gap for the insertion of a stack of paper.

In summary, by employing the manufacturing method of the present invention, an equal number of aluminum balancing pieces 71 and iron rectangular pieces 72 are used to make the hole-punching assembly. As a result, the production cost is lowered, the production process is simplified and the production time is shortened; hence, the efficiency in production is enhanced and more hole-punching assemblies may be produced in a certain period. In conclusion, the manufacturing method of the present invention enables the lowering of production cost and selling price, and hence the method has a higher level of economic value and usefulness.

BRIEF DESCRIPTION OF THE DRAWINGS

The drawings disclose an illustrative embodiment of the present invention which serves to exemplify the advantages and objects hereof, and are as follows.

DETAILED DESCRIPTION OF THE PREFERRED EMBODIMENT

Figure 3:
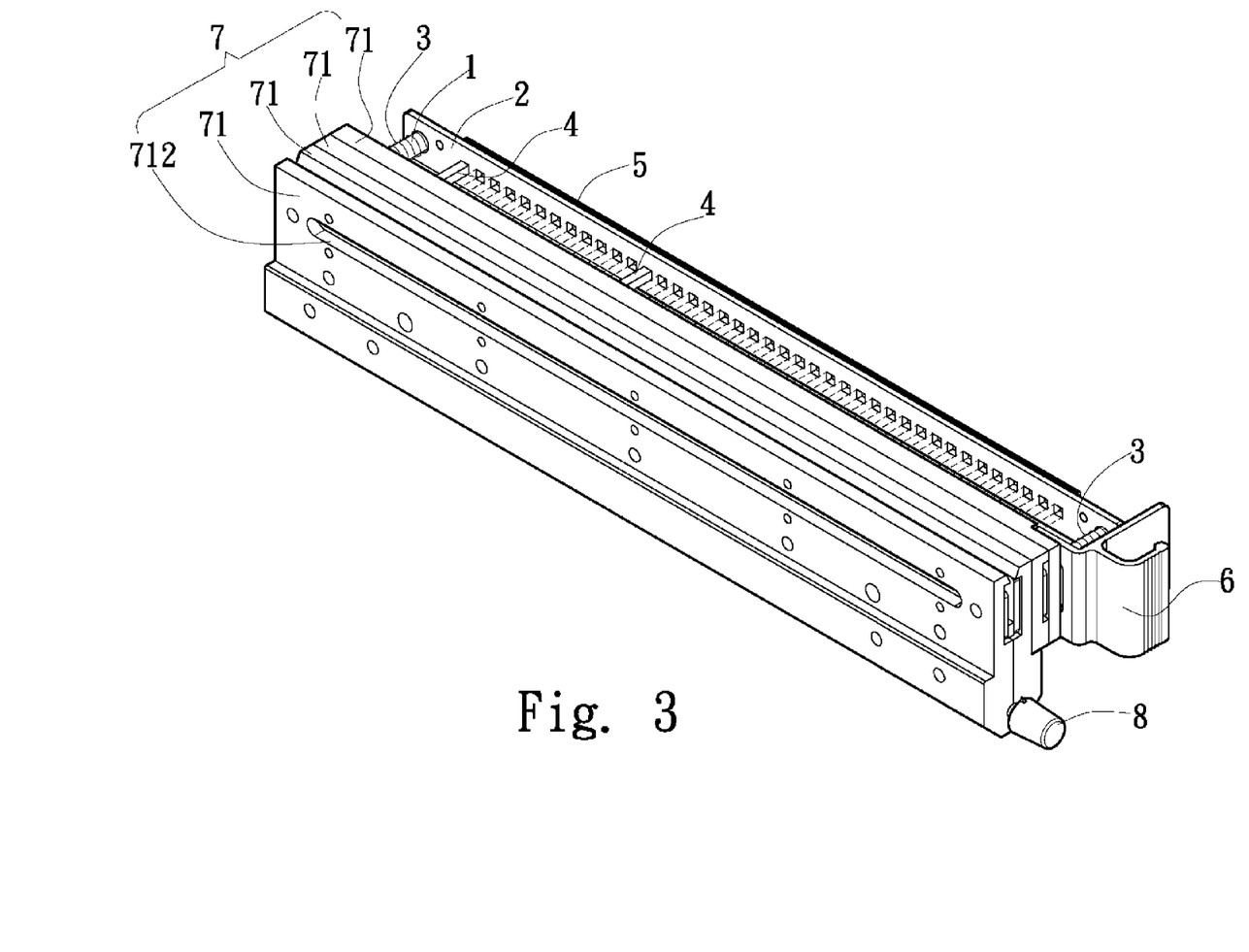
FIG. 3 is a perspective view showing the assembled hole-punching unit of the present invention.
Figure 4:
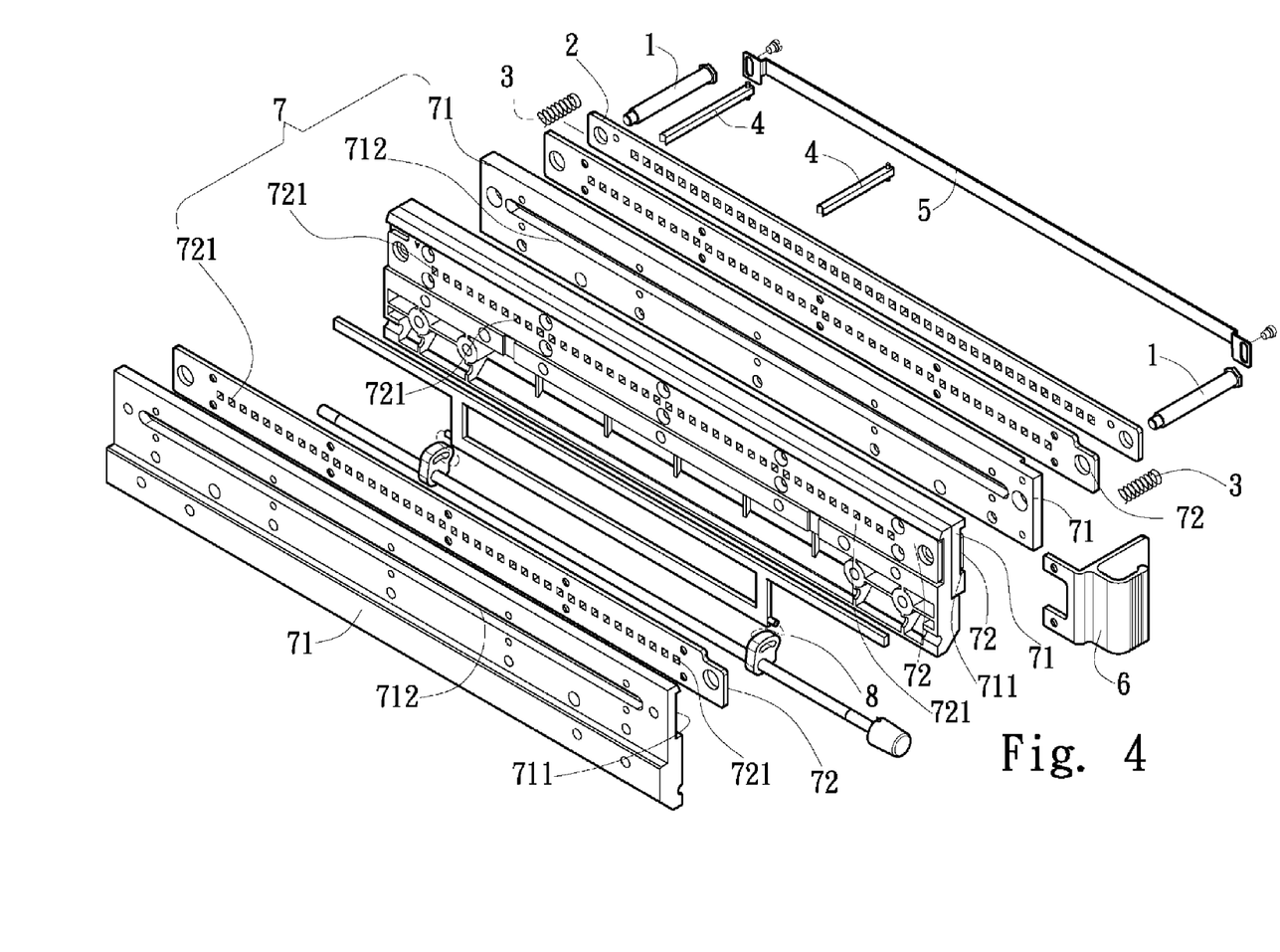
FIG. 4 is an exploded view showing the hole-punching unit of the present invention.
Figure 5:
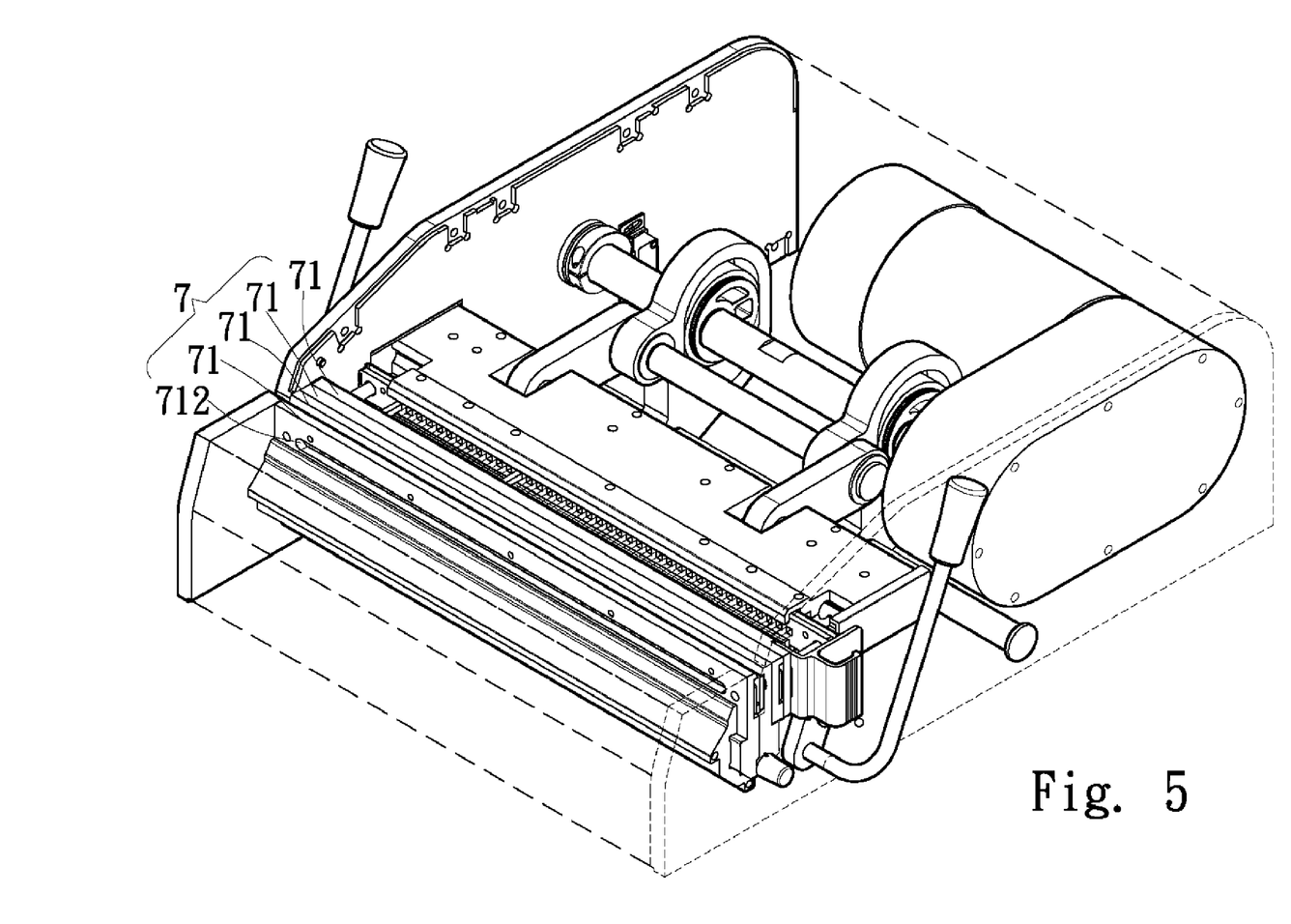
FIG. 5 is a perspective view showing the hole-punching unit of the present invention which has been fitted in a hole-punching machine.

Please refer to FIGS. 3, 4 and 5. FIG. 3 is a perspective view showing the assembled hole-punching unit of the present invention. FIG. 4 is an exploded view showing the hole-punching unit of the present invention. FIG. 5 is a perspective view showing the hole-punching unit of the present invention which has been fitted in a hole-punching machine.

The hole-punching unit of the present invention comprises two balancing rods 1, a holes-positioning piece 2, two elastic elements 3, a plurality of punching pieces 4, a retaining piece 5, a hole-punching assembly 7 (which may be provided with a grip portion 6) and a marginal distance adjusting unit 8 (which may be provided in the hole-punching assembly 7).

The hole-punching unit may have different types of punching pieces according to the shape of the punching pieces and may be fitted in and detached from a hole-punching machine (as shown in FIG. 5).

We will now elaborate on the hole-punching assembly of the present invention and omit the discussion on the two balancing rods 1, the holes-positioning piece 2, the two elastic elements 3, the punching pieces 4, the retaining piece 5 and the grip portion 6.

Figure 6:
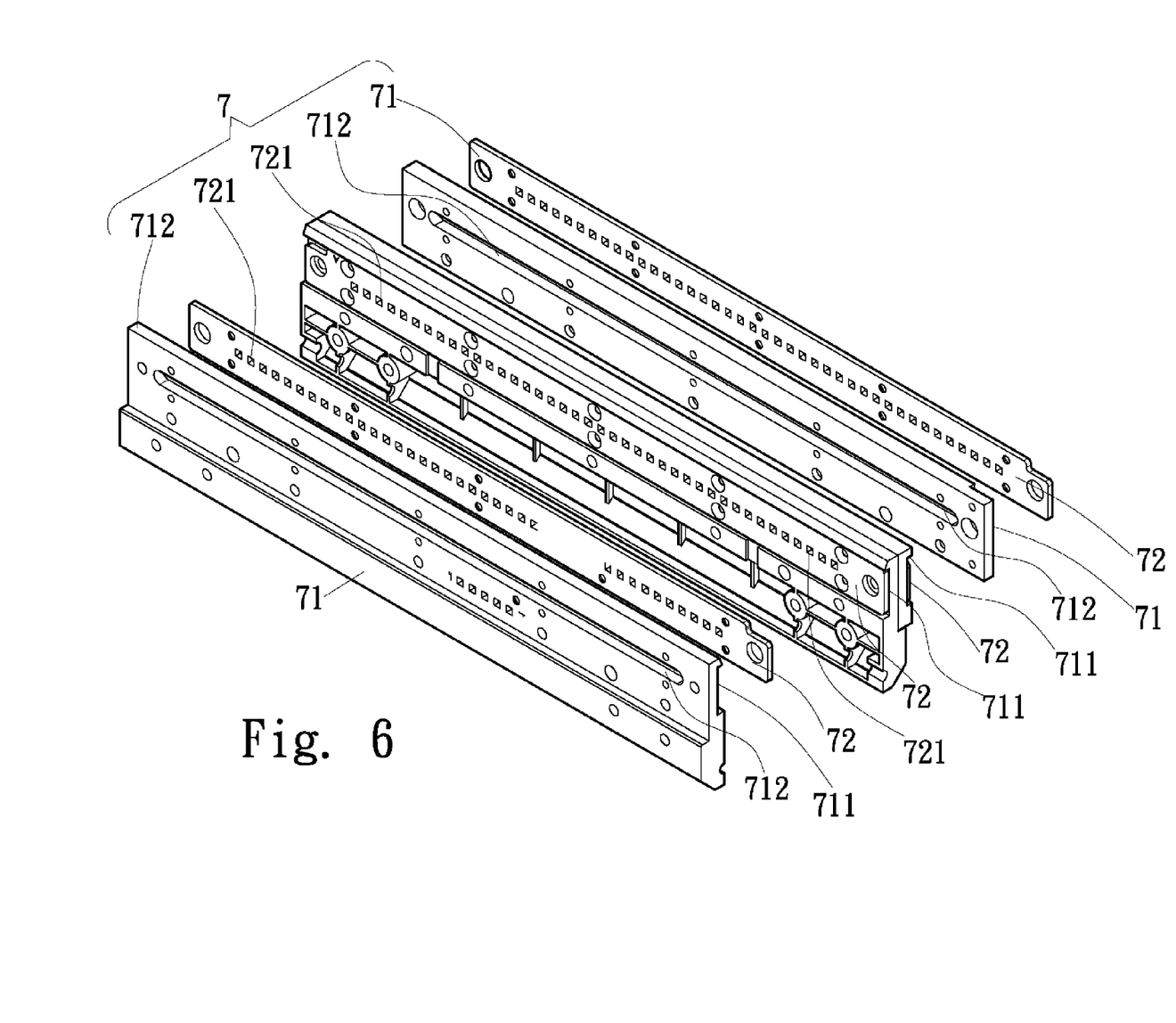
FIG. 6 is an exploded view showing the hole-punching assembly of the present invention.

Please refer to FIG. 6 (FIG. 6 is an exploded view showing the hole-punching assembly of the present invention).

The manufacturing method of the hole-punching assembly 7 comprises the following four steps.

Step 1: Several balancing pieces 71, made of aluminum and with a rectangular shape, are swiftly formed by extrusion. An indentation area 711 is provided on one side of each balancing piece 71.

Step 2: An elongated slot 712 is formed by stamping on the indentation area 711 of each balancing piece 71.

Step 3: Several rectangular pieces 72 (the number of which equals that of the balancing pieces 71), made of iron with a flat rectangular shape are obtained. (Each rectangular piece should be in flush with a balancing piece after it is fitted on.) A row of holes 721 are provided by a single application of stamping on each rectangular piece 72 such that the row of holes 721 may be aligned with the elongated slots of the balancing pieces 71. The shape (which may be rectangular, square or circular) and number of the holes 721 may be altered according to the actual need.

Step 4: Fit each of these rectangular pieces 72 onto the indentation area 711 of a balancing piece 71 so that the former and the latter may be joined together. Then, stack up the balancing pieces 71, each fitted with a rectangular piece 72, such that the two balancing pieces 71 near the proximal end have their rectangular pieces 72 facing each other so as to provide a gap 73 for the insertion of a stack of paper. Then, connect these pieces 71 together by screws or bolts.

From the above, we can see that manufacturing method of the hole-punching assembly 7 is indeed different from the prior art manufacturing method. The manufacturing method of the present invention is characterized as follows: (1) several balancing pieces 71, made of aluminum and with a rectangular shape, are swiftly formed by extrusion; (2) each of the rectangular pieces 72, made of iron and with a flat rectangular shape, is fitted onto the indentation area 711 of a balancing piece 71; (3) a row of holes 721 are provided by stamping on each rectangular piece 72, and an elongated slot 712 is formed by stamping on each balancing piece 71 (such that the row of holes 721 may be aligned up with the elongated slots 712 of the balancing pieces 71); (4) the rows of holes 721 on the rectangular pieces 72 may be formed by a single application of stamping, so are the elongated slots 712 on the balancing pieces 71; and (5) the balancing pieces 71 are stacked up and are connected together by screws or bolts.

Figure 7:
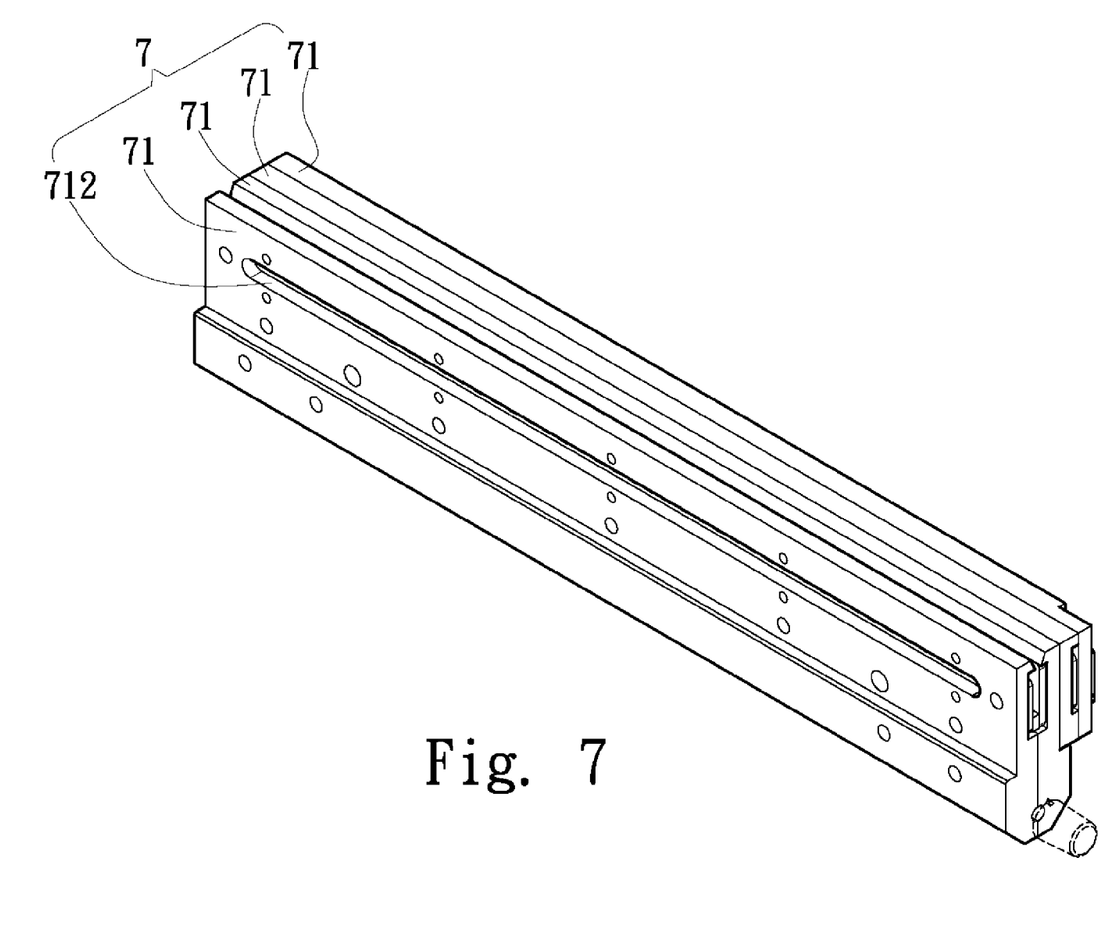
FIG. 7 is a perspective view showing the assembled hole-punching assembly of the present invention.
Figure 8:
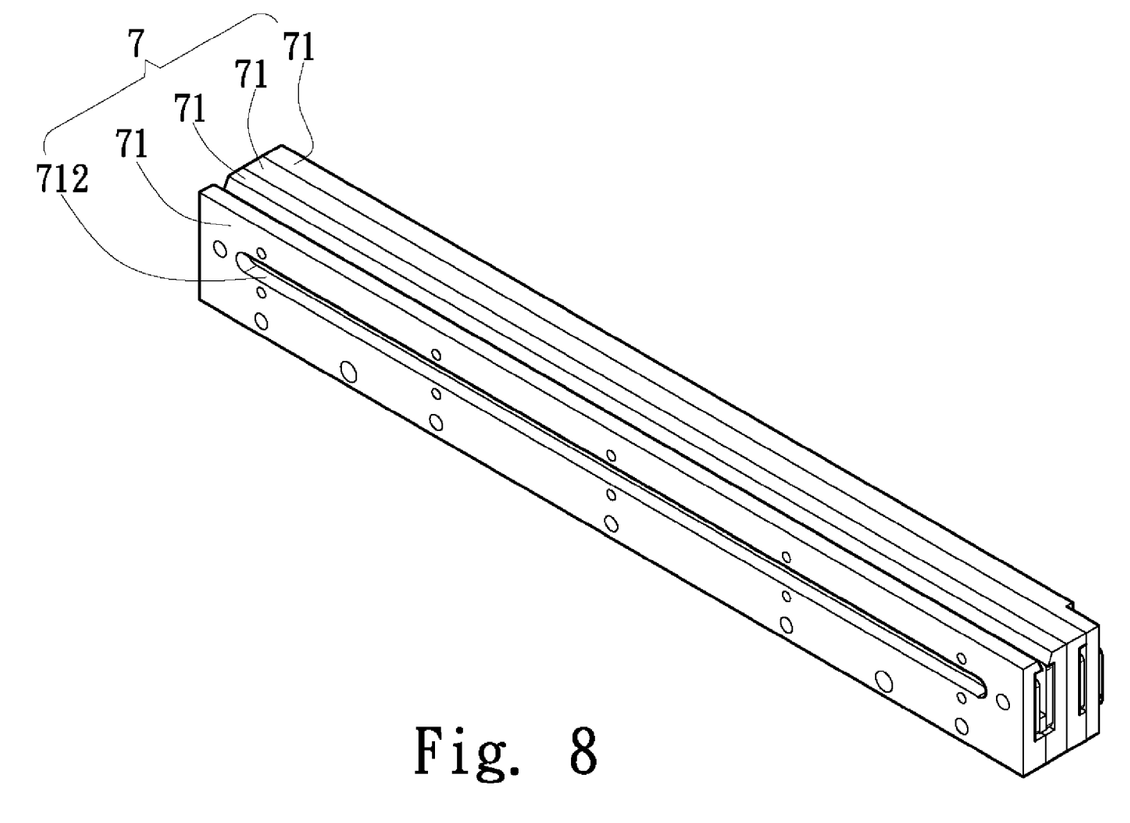
FIG. 8 is a perspective view showing another embodiment of the hole-punching assembly of the present invention.

By employing the manufacturing method of the hole-punching assembly 7, the manufacturing of the hole-punching assembly 7 is simplified and the production cost is lowered (about one tenth of that of the prior art manufacturing method). The balancing pieces 71 are connected together so as to ensure the strength of the hole-punching assembly 7. Hence, the balancing pieces 71 may have a lighter weight so that it would be easier for the hole-punching assembly 7 to be fitted in or detached from a hole-punching machine and the assembly 7 may be easily moved around during manufacturing, installation, packaging and transportation (hence the efficiency in production may be enhanced).

In the prior art, the hole-punching assembly is made of iron and the holes forming process is difficult; however, the manufacturing method of the present invention does not have this disadvantage. In the manufacturing method of the present invention, only one application of stamping is needed to form a row of holes 721 on a balancing piece 71; in addition, because each rectangular piece 72 is lighter and thinner, different shapes (circular, rectangular, triangular or other shapes) may be formed easily so as to meet the hole shapes specified by the buyers and the market.

Because the type of the holes (their shape and the distance between them) on each rectangular piece 72 determines the type of a hole-punching assembly 7, the production cost of each type of hole-punching machine is lowered. In addition, because the hole-punching assembly 7 comprises several balancing pieces 71 and several rectangular pieces 72, if a balancing piece 71 or a rectangular piece 72 is damaged, only that damaged piece needs to be replaced; in contrast, if this happens with the prior art hole-punching assembly, the whole unit would have to be replaced. Furthermore, to manufacture a different type of assembly 7, we only have to provide such type of holes on each rectangular piece 72 by stamping (not needing to redo the whole unit as in the prior art manufacturing method).

In summary, by employing the manufacturing method of the present invention, an equal number of aluminum balancing pieces 71 and iron rectangular pieces 72 are used to make the hole-punching assembly. As a result, the production cost is lowered, the production process is simplified and the production time is shortened; hence, the efficiency in production is enhanced and more hole-punching assemblies may be produced in a certain period. In conclusion, the manufacturing method of the present invention enables the lowering of production cost and selling price, and hence the method has a higher level of economic value and usefulness.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An improved manufacturing method for the hole-punching assembly of a hole-punching unit with a plurality of punching pieces, comprising the following steps:
   (1) forming a plurality of aluminum balancing pieces with a rectangular shape by extrusion, and forming an indentation area on one side of each balancing piece;
   (2) forming an elongated slot by stamping on the indentation area of each balancing piece;
   (3) obtaining a plurality of rectangular pieces, the number of which equals that of the balancing pieces, wherein the width of the rectangular pieces equals the width of the indentation area of the balancing pieces, and forming a row of holes by a single application of stamping on each rectangular piece so as to allow the punching pieces of the hole-punching unit to go through; and
   (4) fitting each of the rectangular pieces onto the indentation area of a respective one of the balancing pieces so that they are joined together, stacking up the balancing pieces, each fitted with one of the rectangular pieces, such that the two balancing pieces near a proximal end have their rectangular pieces facing each other so as to provide a gap for the insertion of a stack of paper, and then connecting the balancing pieces together by screws or bolts.

2. The improved manufacturing method as in claim 1, wherein the rectangular pieces are made of iron.

* * * * *